No. 666,118. Patented Jan. 15, 1901.
B. O. TILDEN.
CENTRIFUGAL TRAP.
(Application filed Nov. 11, 1899.)
(No Model.)
Fig. 1.
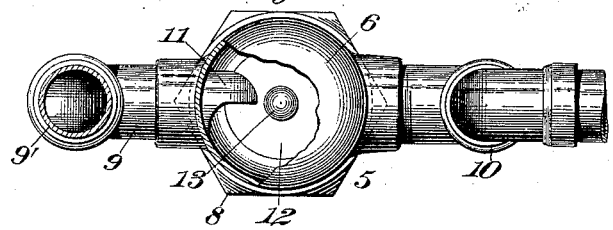
Fig. 2.
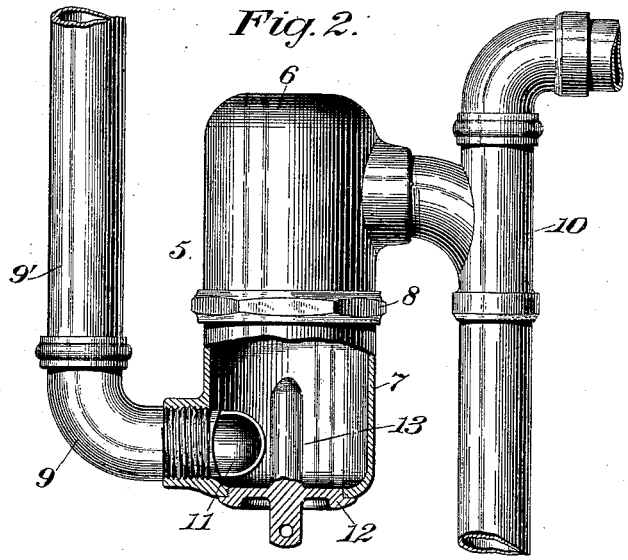
Fig. 3. Fig. 4.
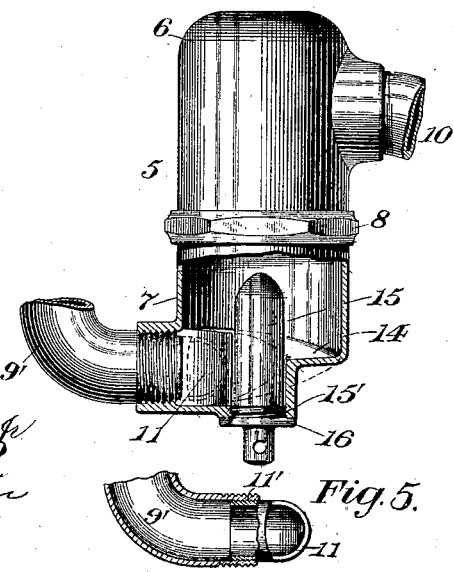
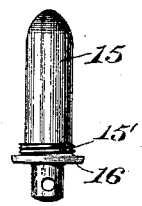
Fig. 5.
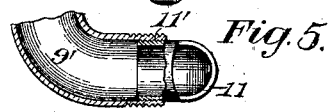
Witnesses:
J. L. Edwards Jr
R. W. Pittman
Inventor:
Bert O. Tilden.
By his Attorney,
F. H. Richards.
THE NORRIS PETERS CO., PHOTO-LITHO., WASHINGTON, D. C.

UNITED STATES PATENT OFFICE.

BERT OLEN TILDEN, OF DETROIT, MICHIGAN.

CENTRIFUGAL TRAP.

SPECIFICATION forming part of Letters Patent No. 666,118, dated January 15, 1901.

Application filed November 11, 1899. Serial No. 736,610. (No model.)

*To all whom it may concern:*

Be it known that I, BERT OLEN TILDEN, a citizen of the United States, residing in Detroit, in the county of Wayne and State of Michigan, have invented certain new and useful Improvements in Centrifugal Traps, of which the following is a specification.

This invention relates to an improvement in traps and is shown applied to a "pot-trap," although it is not limited thereto.

Primarily the object of my invention is the provision of means in a trap of any suitable kind for causing a centrifugal action or whirl of the liquid as it enters such trap, whereby the lighter foreign bodies contained in the liquid—such as grease, &c.—are thrown to the center and in this way are more readily carried off through the effluent-pipe.

In carrying out this invention the inlet-pipe, which is threaded into the body of the trap, as is usual, is equipped with a deflector, which causes the liquid as it enters the trap to assume a rotary motion therein. For cooperation with this deflector I provide the usual plug or screw, removably attached to the bottom of the trap, with a vertical stud or projection, which when the water or other liquid is set into rotary motion will aid in establishing the central passage or vent found in all whirling bodies of liquid and in whirlpools in nature. This plug or projection also acts as a means upon which threads or other similar foreign bodies may be wound, and, it being readily removable, the trap can be cleaned without effort and its efficiency therefore very much increased.

Broadly considered, I am aware that what is known as a "centrifugal trap" is not new, and my invention is intended as an improvement upon the well-known form of centrifugal trap in which the outlet-pipe is located tangentially to the circumference of the trap and the liquid is thereby caused to receive a rotary motion. In this form of trap, however, it has been found in practice that sediment and foreign bodies are not at all times removed, and the problem has been to devise a means by which this result could be accomplished.

In the accompanying drawings, in which like numerals designate like parts throughout the several views, Figure 1 is a plan view, partially broken away, showing one form of my improvement. Fig. 2 is a side elevation, partially in section, illustrating the deflector and the plug or "trap-screw" provided with a vertical projection. Fig. 3 is a side elevation of a modification of the trap, in which the deflector on the inlet-pipe is illustrated by dotted lines. Fig. 4 is a view of the removable plug or projection employed in this modification; and Fig. 5 is a view of another form of the deflector, whereby it may be removably applied to the end of the inlet-pipe.

Referring to the drawings, the trap is designated in a general way by the numeral 5 and is composed, as illustrated, of two sections 6 and 7, united by an intermediate coupling or nut 8. Coupled to the section 7 is the elbow 9, attached to the inlet-pipe 9', and removably united to the section 6 is the outlet or effluent pipe 10, said pipes and trap-sections being so arranged and organized that they may be adjusted relatively to each other in the manner set forth in my Patent No. 640,430, dated January 2, 1900.

The numeral 11 designates a deflector, which may be either integral with the elbow 9 of the inlet-pipe 9', threaded into the lower portion of the trap-body, as shown in Fig. 2, or it may be made removable from said elbow and united thereto by screw-threads, as shown at 11' in Fig. 5, if desired. If made integral with the elbow 9, the end of said elbow may be simply cut out and then shaped to form the deflector in the manner illustrated in said Fig. 2, or said deflector may be cast in the desired form as a part of the elbow, whereas in Fig. 5 the deflector 11 is a removable piece which may be applied to the elbow 9 by a screw-threaded connection or detached therefrom, if desired.

Located in the bottom of the trap is the usual trap-screw or plug 12, (shown in Fig. 2,) threaded in said trap portion and provided with a vertical projection 13 for a purpose hereinafter stated.

In the form of the invention shown in Figs. 1 and 2 the liquid entering the trap by way of the inlet-pipe 9' and elbow 9 impinges against the wall of the deflector 11 and is caused thereby to change its course and to assume a rotary motion, or if in rotary motion to continue the same, this action being aided by the plug or projection 13, which assists in maintaining the usual passage or vent through which the air entering the water is drawn by suction. After leaving the upper portion of the trap-body the water or other liquid passes off from the same by means of the effluent or exit pipe 10, which leads to a suitable connection communicating with the sewer.

It is of course to be understood that the inlet-pipe 9', leading into the lower section 7 of the trap, constitutes the outlet-pipe for a washbasin, lavatory, or other device. It is a well-known fact that when such a washbasin or lavatory is filled and the plug is removed the water in its exit therefrom will at once rotate and will have formed in its center a core or duct, due to its centrifugal action and the inrush of air at this particular time. This action of the water causes all grease, &c., to be thrown toward the center and to pass into the waste-pipe at a greater velocity than the water would naturally pass under the usual influence of atmospheric pressure, and if the water should be warm the air rushing in through the central core or duct would naturally have a tendency to congeal the greasy particles. This fluid as it runs from the lavatory through the waste-pipe 9' and elbow 9 to the trap-inlet is therefore usually in rotary motion, and as it strikes the deflector it will continue this motion and will not fill the air core or duct, and therefore the greasy particles will still be retained at the center, and the air core or duct being maintained aids in giving a greater lifting force to the water as it enters the trap and passes through the same. As above stated, the plug 13 aids in maintaining this central air core or duct, and practical experience has proved that in a trap of this construction the tendency of greasy particles to adhere to the walls thereof is practically eliminated. Furthermore, as will be obvious, if thread or other fibrous material should enter the trap through the elbow 9, these materials if retained in the trap would naturally tend to wrap or wind around the central core or plug 13, and as this core may readily be removed it will be seen that the trap as thus constructed is one of greater efficiency and is to all intents and purposes a self-cleansing trap, for it is seldom that such threads, fibrous material, or other foreign bodies will not be carried off with the water as it leaves the trap.

In the construction illustrated in Fig. 3 the deflector 11, either as an integral part of the elbow 9 or removable therefrom, as shown at 11' in Fig. 5, is employed. In this construction the bottom of the trap-body is so shaped that a spiral configuration 14 is obtained, this spiral as it rises terminating at a point just above the end of the elbow 9 and of course above the deflector 11 or 11'. In this modification a plug 15, having an exteriorly-threaded portion 15' and below that a flange 16 for contact with the exterior wall of the trap, is provided.

In operation the water or other liquid entering from the pipe 9' and elbow 9 is caused to change its course by the deflector 11 and is guided and lifted during its centrifugal motion by the spiral plate 14. By terminating this spiral plate above the inlet-opening of the elbow 9 no obstruction to the passage of the rotating fluid is encountered, and said fluid in its whirling action causes the lighter foreign particles contained therein to be thrown to the center of the trap and is forced from said trap, carrying all sediment or foreign material with it.

While my invention, as above stated, is shown applied to a particular form of sectional pot-trap, yet it is distinctly to be understood that it is not limited thereto, for, as is obvious, it may be applied in either of the forms shown to grease-traps and traps of other suitable constructions.

By dividing the trap in the manner set forth in my patent above mentioned the inner walls of the sections thereof may be readily made smooth by tooling, whereby when the trap is assembled a smooth-bore cylinder is produced and foreign bodies are prevented from adhering to the walls thereof. Furthermore, liquid entering a trap of this kind will rotate until it reaches the effluent-pipe and will have greater velocity, as well as lifting power, as there will be less friction between the same and the smooth walls of the trap, and heavier substances carried by the liquid—such as sand, screws, nails, or other foreign bodies—will be thrown from the center by centrifugal force and will act as scouring agents to keep said smooth walls clean.

No claim is made to the divided trap shown and described, for it constitutes the subject-matter of my Patent No. 640,430 above mentioned.

Having described my invention, what I claim, and desire to secure by Letters Patent, is—

1. In a trap, the combination, with a trap-body, of an inlet-pipe carrying a device for deflecting the course of the fluid passing through said pipe and thereby causing the same to rotate; and an outlet-pipe.

2. In a trap, the combination, with an inlet-pipe having a deflector, of a plug or projection located in the trap-body, and an exit-pipe.

3. In a trap, the combination, with an inlet-pipe having a deflector, of a removable screw or plug carrying a projection coöperating with said deflector in producing rotary motion of the fluid entering the trap, and an outlet-pipe.

4. In a trap, the combination, with a trap-body made in sections, of means for uniting said sections so that they may be adjusted one upon the other; an inlet-pipe carrying a deflector and connected with one of said sections said deflector serving to change the course of the fluid and thereby cause the same to rotate within the trap-body; and an exit-pipe connected with the other of said sections.

5. In a pot-trap, the combination, with the trap-body composed of sections adjustably united, of an elbow carrying a deflector, said elbow being threaded into the lower of said trap-sections; a central plug or projection; and an exit-pipe connected with the top section of the trap.

BERT OLEN TILDEN.

Witnesses:
JOHN JOSHIRE,
CHARLTON E. PARTRIDGE.